US008675060B2

(12) United States Patent
Ghose et al.

(10) Patent No.: US 8,675,060 B2
(45) Date of Patent: Mar. 18, 2014

(54) MACHINE VISION BASED OBSTACLE AVOIDANCE SYSTEM

(75) Inventors: Debasish Ghose, Karnataka (IN); Varun Raj Kompella, Karnataka (IN)

(73) Assignee: Indian Institute of Science, Karnataka (IN)

( * ) Notice: Subject to any disclaimer, the term of this patent is extended or adjusted under 35 U.S.C. 154(b) by 607 days.

(21) Appl. No.: 12/643,207

(22) Filed: Dec. 21, 2009

(65) Prior Publication Data

US 2011/0050883 A1    Mar. 3, 2011

(30) Foreign Application Priority Data

Aug. 28, 2009  (IN) .................... 02096/CHE/2009

(51) Int. Cl.
| H04N 7/00 | (2011.01) |
| H04N 7/18 | (2006.01) |
| G06K 9/00 | (2006.01) |
| G06K 9/38 | (2006.01) |
| G06K 9/36 | (2006.01) |
| G06K 9/20 | (2006.01) |

(52) U.S. Cl.
USPC ............... 348/113; 348/61; 348/62; 382/168; 382/172; 382/283

(58) Field of Classification Search
USPC ................ 348/26, 28, 61, 62, 113, 135–142; 382/265, 274, 162–169, 100, 114, 382/106–107, 286, 294, 299, 300, 308
See application file for complete search history.

(56) References Cited

U.S. PATENT DOCUMENTS

| 5,040,116 | A | | 8/1991 | Evans | |
| 5,790,403 | A | * | 8/1998 | Nakayama | 701/28 |
| 5,889,885 | A | * | 3/1999 | Moed et al. | 382/172 |
| 6,005,978 | A | * | 12/1999 | Garakani | 382/218 |
| 7,881,497 | B2 | * | 2/2011 | Ganguli et al. | 382/104 |
| 8,391,612 | B2 | * | 3/2013 | Natroshvili et al. | 382/199 |
| 2003/0174253 | A1 | * | 9/2003 | Ito et al. | 348/699 |
| 2005/0063565 | A1 | * | 3/2005 | Nagaoka et al. | 382/104 |
| 2005/0200760 | A1 | * | 9/2005 | Nakakuki | 348/623 |
| 2009/0046908 | A1 | * | 2/2009 | Safdar et al. | 382/128 |
| 2009/0067707 | A1 | * | 3/2009 | Sim et al. | 382/154 |
| 2011/0110596 | A1 | * | 5/2011 | Matsuda et al. | 382/190 |

OTHER PUBLICATIONS

Chao et al., Visually Guided Obstacle Voidance, 1999, IEEE, 6th International Conference on Neural Information Processing, vol. 2, pp. 650-655.*
Das et al., Image Edge Detection and Enhancement by an Inversion Operation, 1998, Applied Optics, vol. 37, No. 35, pp. 8254-8257.*
Bovik, Al, "The Essential Guide to Image Processing" 2009, Academic Press. 1st Edition. pp. 71-90.*
Bell, D.A., Borenstein, J., Levine, S.P., Koren, Y. and Jaros, J., "An Assistive Navigation System for Wheelchairs Based upon Mobile Robot Obstacle Avoidance", IEEE International Conference on Robotics and Automation (ICRA), May 8-13, 1994, San Diego, CA., USA, pp. 2018-2022.

(Continued)

*Primary Examiner* — Joseph Ustaris
*Assistant Examiner* — Kevin McInnish
(74) *Attorney, Agent, or Firm* — Brundidge & Stanger, P.C.

(57) ABSTRACT

Machine vision based obstacle avoidance system is provided. The system utilizes a CCD camera to capture an image. A normalized image and dynamic masking is used in object detection.

20 Claims, 13 Drawing Sheets

(56) References Cited

OTHER PUBLICATIONS

Prassler, Erwin, Scholz, Jens and Fiorini, Paolo, "Navigating a Robotic Wheelchair in a Railway Station during Rush Hour," International Journal on Robotics Research. 1999, vol. 18, No. 7, pp. 1-22.
"Appearance-Based Obstacle Detection With Monocular Color Vision", I. Ulrich, et al., Proceedings of the AAAI National Conference on Artificial Intelligence, Austin, TX, Jul./Aug. 2000.
"Building and Evaluating an Intelligent Wheelchair", B. Kuipers, Dec. 10, 2006. http://www.cs.utexas.edu/-kuipers/papers/wheelchair.pdf.

International Search Report and Written Opinion for PCT International Patent Application No. PCT/IB2010/053649, mailed Dec. 6, 2010.
Kompella, V. R. and Ghose, D., "Vision-based Guiding Cane: An assistive technology for Visually-ImpairedPeople," Aug. 26, 2008, pp. 1-4.
Kompella, V. R. and Ghose, D., "Vision-based Wheelchair for the Challenged people," Aug. 26, 2008, pp. 1-4.
Ulrich, I. and Borenstein, J., "The GuideCane—Applying Mobile Robot Technologies to Assist the Visually Impaired," IEEE Transactions on Systems, Man, and Cybernetics,—Part A: Systems and Humans, Mar. 2001, vol. 31, No. 2, pp. 131-136.

* cited by examiner

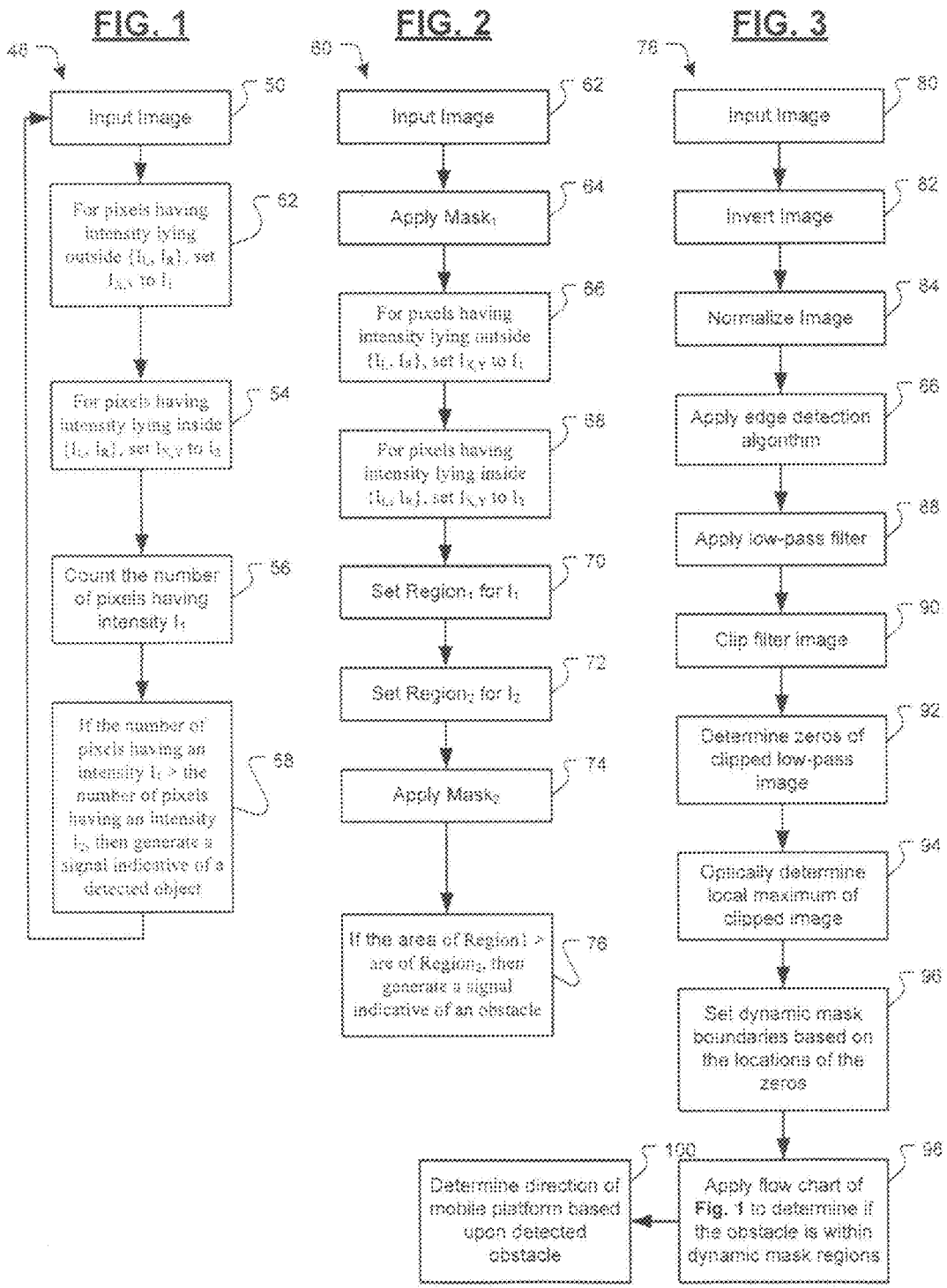

| $Q$ | $a_l > a_r$ | $a_l <= a_r$ | $Q^+$ |
|---|---|---|---|
| 0 | - | - | $Q$ |
| 1 | - | - | $Q$ |
| 2 | 1 | 0 | 0 |
| 2 | 0 | 1 | 1 |
| - | 0 | 0 | 2 |

Table 1. Determination of the next state $Q^+$

MACHINE VISION BASED OBSTACLE AVOIDANCE SYSTEM

CROSS-REFERENCE TO RELATED APPLICATIONS

This application claims the benefit and priority of India Application Serial No. 02096/CHE/2009, filed Aug. 28, 2009. The entire disclosure of the above application is incorporated herein by reference.

BACKGROUND

Machine vision systems have been proposed in the past as a possible mechanism for object avoidance. Typically, the systems utilize complicated systems which attempt to calculate the distance of an object from the mobile platform based on movement of an object through an array of pixels of a CCD camera. Often, these systems utilize projected laser spots or lines which are projected along a known angle from a moveable platform to calculate the relative distances of an object from the mobile platform. While these systems have been used successfully to varying success, they are computationally complex, which reduces the allowable movement speeds of the mobile platform.

SUMMARY

To overcome the shortcomings of prior machine vision systems, a processor controlled machine vision system for a mobile platform is provided. The system utilizes a CCD camera to capture an image. The image can then be converted to a gray scale image. Pixels having intensity value away from the histogram's global maximum are assigned a first intensity value $I_1$, e.g., $I_1=0$. The other pixels, which have intensity values close to the global maximum, are assigned a second intensity value $I_2$, e.g., $I_2=255$, thereby forming a binary image. The number of pixels having the intensity of $I_1$ and $I_2$ are counted. If the processor determines the number of pixels having an intensity of is greater than the number of pixels having an intensity of $I_2$, it generates a signal indicative of an object detection.

In one teaching, the system can utilize varying types of masks to improve object detection. For example, one mask can remove objects from the input image which are far from the mobile platform. Additionally, the processor can use a second mask to look for objects close to the mobile platform.

In yet another teaching, disclosed is a method for dynamically providing masks of varying size which will allow the mobile platform to autonomously determine a best path.

In another teaching, histograms are formed of the variation of intensities of a gray scale image. These histograms can be used to determine appropriate threshold levels for normalization of the images as well as whether an obstacle is located within a imaging system's view.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 represents a flow chart of the process according to the teachings of the present disclosure;

FIG. 2 represents a second flow chart according to another teaching;

FIG. 3 represents another flow chart according to yet another teaching;

DETAILED DESCRIPTION

Figure 4:
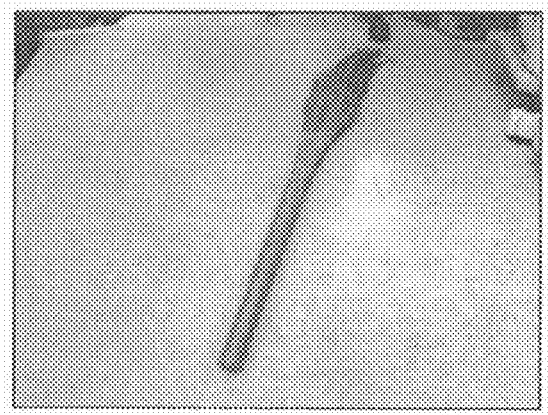
FIGS. 4-12 represent object detection according to the process of FIG. 3.
Figure 5:
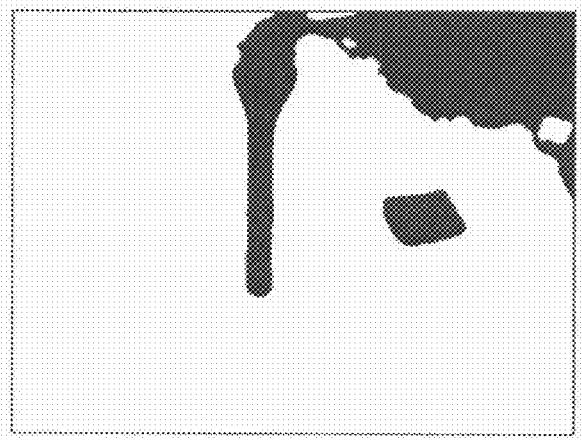

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1 is a flow chart 48 representing a method for detecting according to the present teachings. In process block 50, an image of a field of view is detected by an optical input module, such as a CCD camera. In process block 52, pixels having intensity or color not lying between $I_L$ and $I_R$ are set to the first predetermined intensity $I_1$. In process block 54, pixels having an intensity or color lying between $I_L$ and $I_R$ are set to a second predetermined intensity $I_2$.

In process block 56, the system counts the number of pixels having intensities $I_1$ and $I_2$. If the number of pixels having an intensity of $I_1$ is greater than the number of pixels having an intensity of $I_2$, then an object is detected within a field of view. A signal indicative of the detection of an image is then generated by process block 58

As seen in FIG. 2, a series of masks can be applied to improve object detection. In this regard, as shown in process block 64, a mask $M_1$ can be applied to an input image. This mask can be used to reduce the effect of objects or locations which are a distance away from the mobile platform. Additionally, after regions are set based on normalized pixel intensity values as described above, a second fixed mask $M_2$ is applied to the image to capture the intensity switch that occurs for the pixels belonging to the ground surface situated close to the mobile platform. The sizes of mask $M_1$ and mask $M_2$ can be adjusted to adjust the sensitivity of the system. Additionally, adjustment of the size of the masks may allow for an increase or decrease in the speed of the mobile platform. While shown as horizontal masks, vertical masks may be applied to the image as well. These masks can be of fixed width and can be overlapping. As described below, these masks can be of varying size, which can be dynamically set.

As shown in FIG. 3, the dynamic mask formation can be accomplished using a processor and CCD camera. In process block 80, the image is received by the processor from the CCD camera. In process block 82, the image is inverted to simplify future calculations. In process block 84, the image is normalized as described in the flow charts shown in FIGS. 1 and 2. After normalization, an edge detection system is run on the inverted image in process block 86. This can be a Canny Edge Detection algorithm. From this algorithm, an edge detection image is formed. An edge detection filter is used in part to obtain a maximum bounding graph of the boundaries of an obstacle. It is envisioned that other edge detection algorithms may be used, such as the Deriche algorithm. The Canny Edge Detection, however, provides an edge detection algorithm that has a low computational complexity.

A low pass filter can be applied to the edges to smooth the results in process block 88. The spatial information of the binary edge-image obtained from the edge detector is converted to a graph with a (x,y)-coordinates of all or most of the points having an intensity equal to the second predetermined intensity, e.g. 255. The image can then be inverted resulting in a maximum bounding graph. It is noted that small dots or marks on the ground surface may give rise to the detection of an edge and, therefore, a sharp peak in the graph. To eliminate sharp noise peaks, the graph can be filtered using the following low-pass filter:

$$Y_t = (1 - 1 + a^2) y_{t-1} + (a - a^2) x$$

where, $y_t$ is the y-coordinate of the graph, i.e. the coordinate of the maximum bounding white pixel. It is envisioned that a clipper may then be optionally applied to the results in process block 90 to remove additional noise.

The resulting image is analyzed to determine the locations of zeros and local maximums, or peaks, in the image. Filtering is applied to smoothen the histogram curve in order to detect stable mask boundaries. Additionally, the location of the peaks or local maximum is used to define the size of masks within the image. In this regard, in process block 96, dynamic mask boundaries based on the location of the zeros are set. In process block 98, the flow chart of FIG. 1 or 2 can be applied to determine if an obstacle is within the dynamic mask range.

In process block 100, the mobile platform determines the course of the mobile platform depending on the location of detected obstacles within the imaging system's field of view.

According to the teachings herein, shown in FIGS. 4-12 is the use of a Dynamic Mask System for Object Detection as described above. FIG. 4 represents an obstacle within a field of view of the Machine Vision System. In this regard, a broom is shown on a relatively smooth ground surface. As described above in the description of FIGS. 1 and 2, FIG. 5 represents a normalized image of FIG. 4. Pixels having intensity value away from the histogram's global maximum are assigned a first predetermined intensity value $I_t$. In this non-limiting example, the intensity is set to zero. The other pixels, which have intensity values close to the global maximum, are assigned a second predetermined intensity value $I_2$. In this non-limiting example, the intensity is set to 255. It is understood that that the predetermined intensity and the second predetermined intensity may be set to other values. As described below in detail, the processor can automatically determine an appropriate threshold.

The Histogramic Intensity Switching (HIS) system described herein uses the principle of appearance-based obstacle detection. According to this principle, any pixel that differs in appearance from the ground is classified as an obstacle. HIS system does not make use of any distance measurements between the detected obstacles and the camera. This makes the mobile platform detect obstacles even on an uneven terrain. It is just the mere appearance of the obstacle in front of the camera which is being considered in the decision-making process.

For each image that is captured by the camera, a normalized intensity histogram $H_1$ of the frame is generated using a mask $M_1$. By increasing the height of the mask, the mobile platform needs to travel lesser distances toward the obstacle before it makes an avoidance maneuver. On the other hand, when the mask length is smaller, the mobile platform needs to travel closer to the obstacle before avoiding it. It basically sets the upper limit of the detection distance of the obstacle from the mobile platform. Mask $M_1$ could also be set according to the mobile platform size. This enables the system to adjust to different sizes of mobile platforms. Next, the histogram generated using mask $M_1$ is passed through a low-pass filter to get a smooth output $H_{1f}$ removing all the high frequency components in the histogram. Then, the maximum peak of the filtered histogram $H_{1f}$ is located and its corresponding intensity value is found ($I_M$). Two intensity values $I_L$ and $I_R$ are then found in $H_{1f}$ by using the following operations:

$$I_L = \max\{i | f(i-\delta) > f(i), f(i+\delta) > f(i)\}$$

$$I_R = \min\{j | f(j-\delta) > f(j), f(j+\delta) > f(j)\}$$

$$\forall i \in (\delta, I_M) \text{ and } \forall j \in (I_M, 255-\delta)$$

where, i (or j) is an intensity value lying between 0 and 255, f(i) is the number of pixels having intensity i found from the histogram, $I_M$ is the intensity where the maximum occurs, and $\delta$ is a resolution parameter which is used to eliminate the occurrences of tightly spaced spurious minima in the histogram.

$$R_1 = [I_L, I_R], R_2 = [0, 255] \setminus [I_L, I_R]$$

Figure 6:
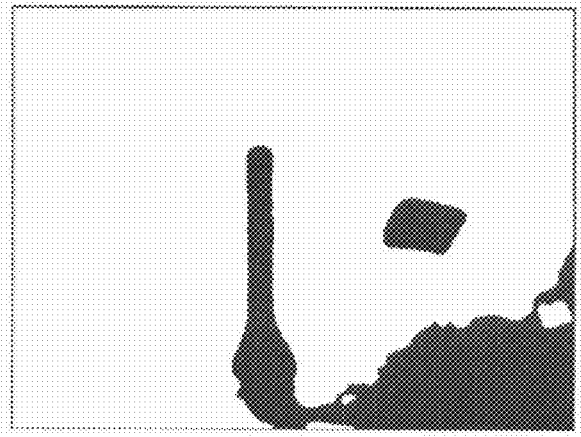
Figure 7:
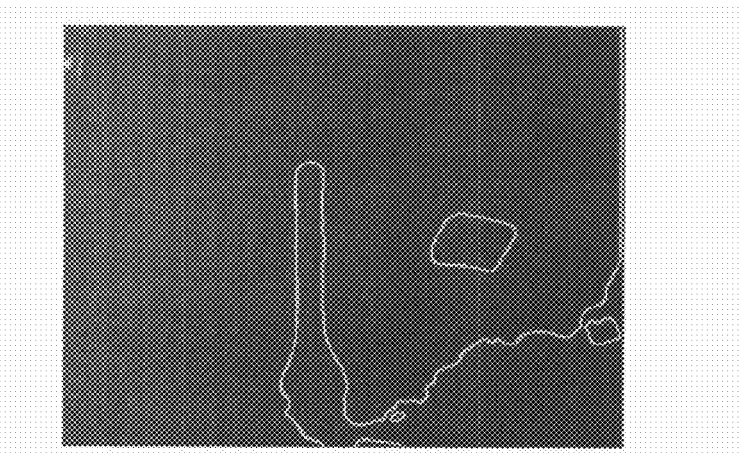

FIG. 6 represents the optical inversion of the image which has been performed for computational expediency. FIG. 7 represents the application of an edge detection system which is used to distinguish the regions $R_1$, and $R_2$ which are defined by the intensities $I_L$ and $I_R$. It is envisioned that a Canny edge detecting algorithm can be used. However, it should be appreciated that a conversion using other edge detection system is possible.

Figure 8:
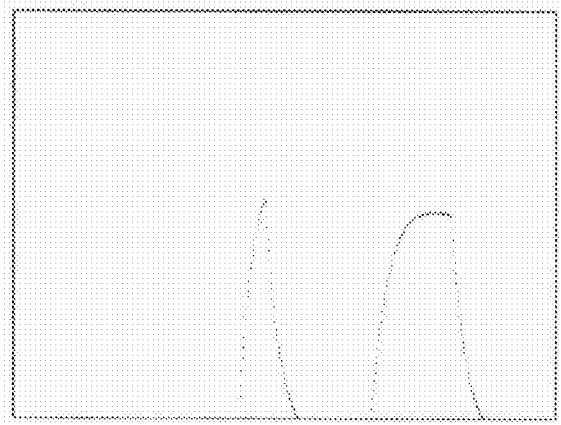
Figure 27A:
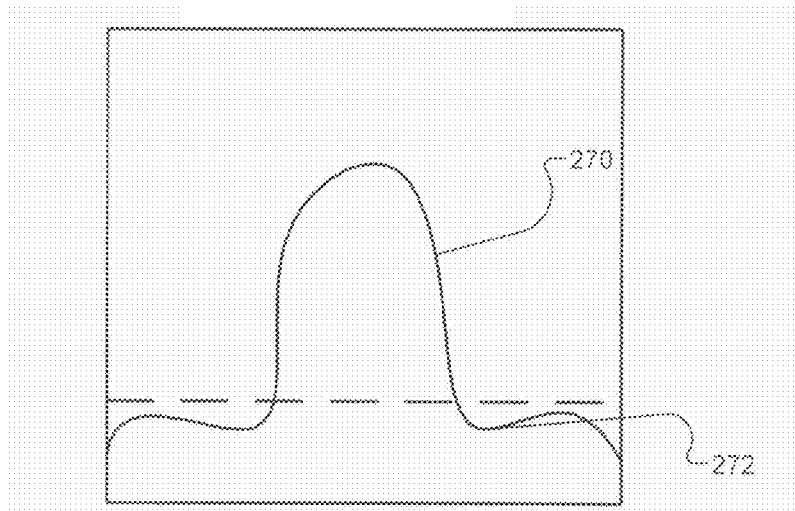
FIGS. 27A, B and C represent an example of clipping an image.
Figure 27B:
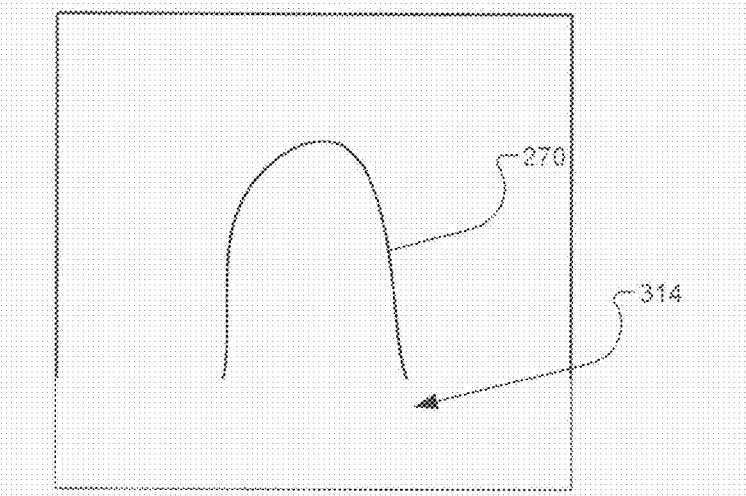
Figure 27C:
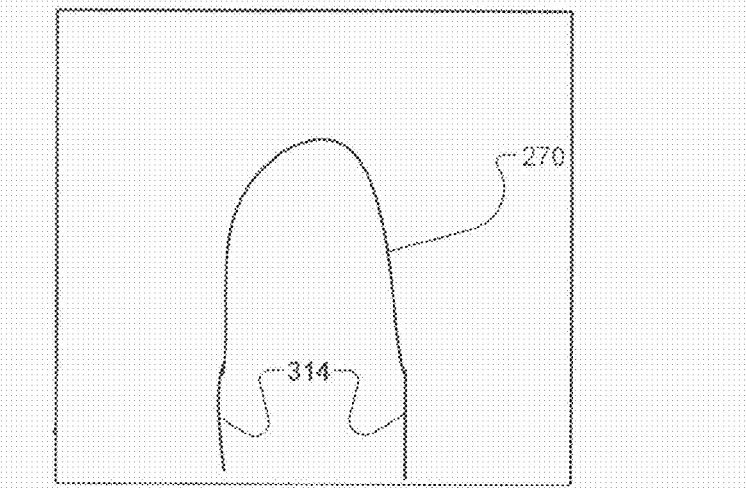

FIG. 8 represents the application of a low pass filter to the image shown in FIG. 7. Additionally, optionally shown is the application of a clipper to the image to reduce the effects of noise. FIGS. 27A, 27B and 27C are provided for an example of clipping. In FIG. 27A a maximum bounding graph 270 received by the low pass filter. The low pass filter identifies a portion of the image to be clipped 272. The portion to be clipped can be a predetermined portion of the graph 272. FIG. 27B shows an example of the clipped output 274. As can be observed from the figure, the identified portion of the graph 272 has been removed from the maximum bounding graph. FIG. 27C shows the output of the low pass filter after clipping. In the figure, the portion that was removed from the image 270 is replaced by a smoothed finish to the graph 274, indicative of an observed object. It is envisioned that clipping techniques may vary and the figures depict but one example of clipping.

Figure 9:
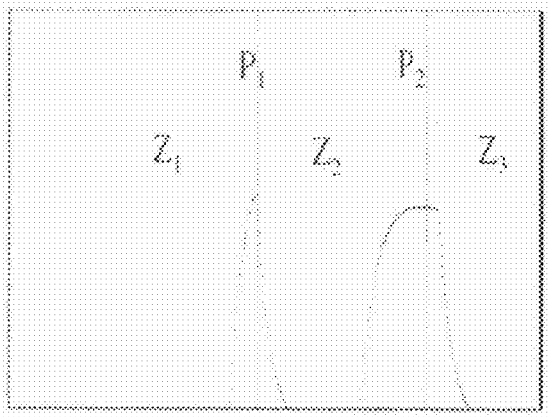

FIG. 9 represents the detection of localized zeros and local maximums in the image shown in FIG. 8. From these locations, dynamic masking regions are formed. It should be noted that rules are established to reduce errors in the formation of the dynamic masks. These rules include the relationship of the zero locations with respect to each other as well as the relationship to the local maximums or peaks. For example, the zeros are preferably a predetermined distance from each other. This will reduce the likelihood objects such as a coin will trigger an individual mask formation.

Distance (PSD) is used to avoid the detection of multiple local peaks that are very closely situated. This helps in detection of the other strong peaks in the image. To find the width of the masks, the graph is passed to a zero detector, which detects the first encountered zeros about the peaks. FIG. 9 shows the detected peaks and zeros. The graph values at x=0 and x=(Image-width) are made zero in order to find a mask for a rising or a falling peak at the boundaries of the graph. The distance between these two detected zeros is termed as the mask-width. A minimum for the values that a mask-width can take a set so as to avoid obstacles of very small sizes getting detected and to make it less error prone. Duplication of the generated masks is avoided by identifying peaks sharing same zeros.

Figure 10:
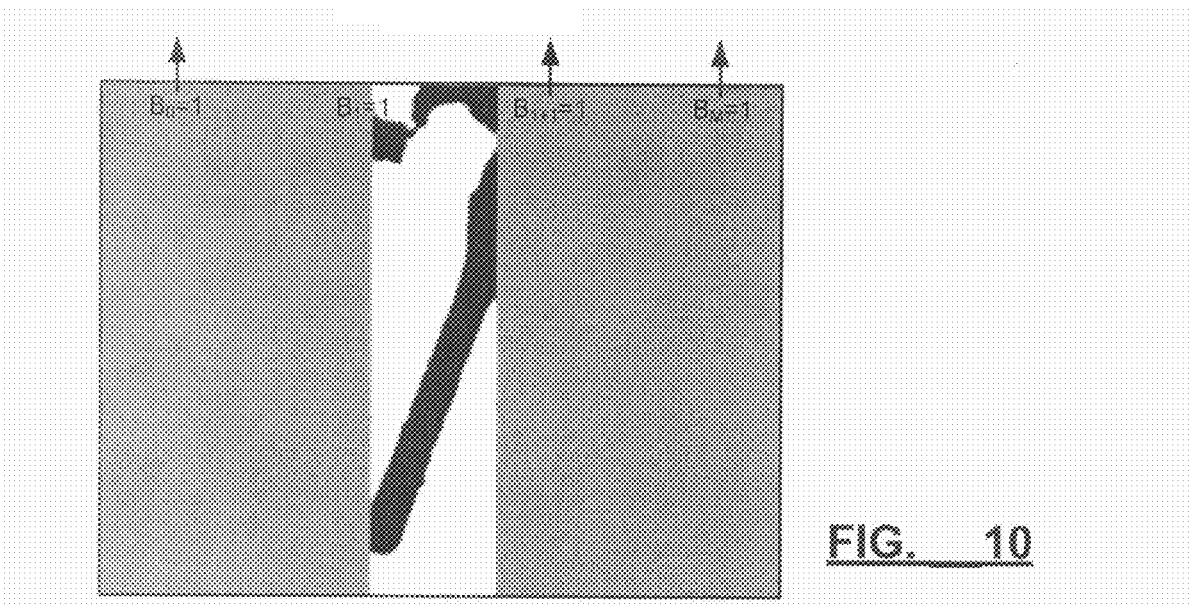
Figure 11:
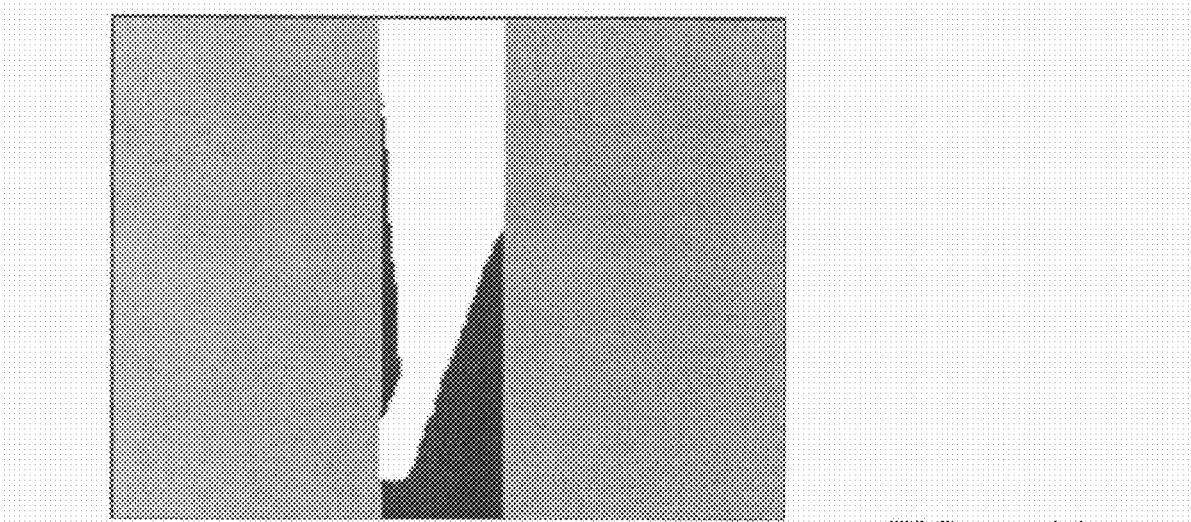

FIG. 10 represents a dynamic mask formed from image of the obstacle in FIG. 4. The flow charts of FIG. 1 or 2 can be run to determine if the pixel count will indicate an obstacle within the masked region. As shown in FIG. 11, the area behind the obstacle is unavailable for passage and is set to the same region as the obstacle.

Figure 12:
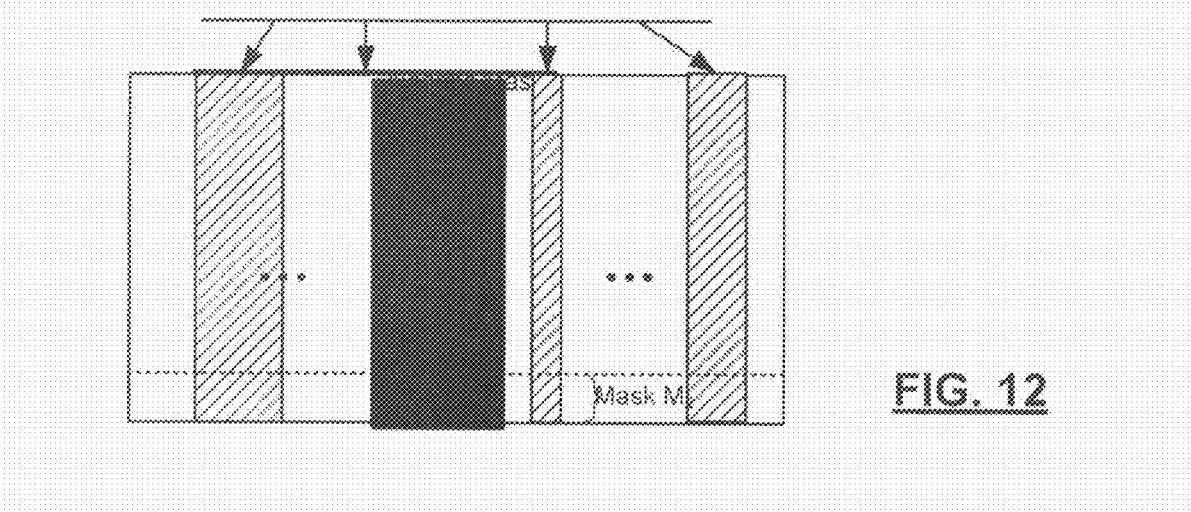

As shown in FIG. 12, a plurality of masks can be applied to the digital image. After detecting an obstacle within the masked area, the processor indicates that passage through the region is not possible. These masked areas can then be flagged with their state of obstructedness. As further described below, with reference to FIG. 25, a truth table can be formed which can be used by the processor to map the travel of the mobile platform. After detecting an obstacle within the masked area, the processor indicates that passage through the region is not possible.

Figure 13A:
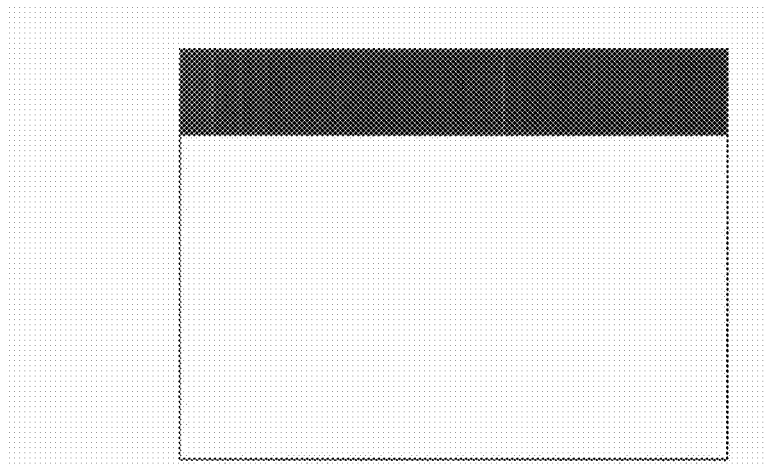
FIGS. 13a-13c represent masks used to detect objects within a field of view.
Figure 13B:
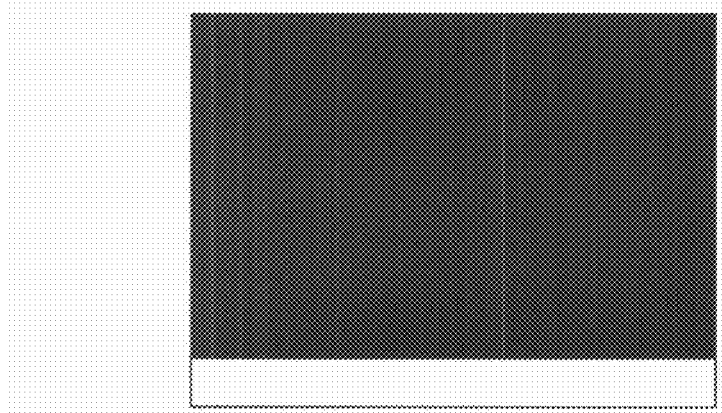
Figure 13C:
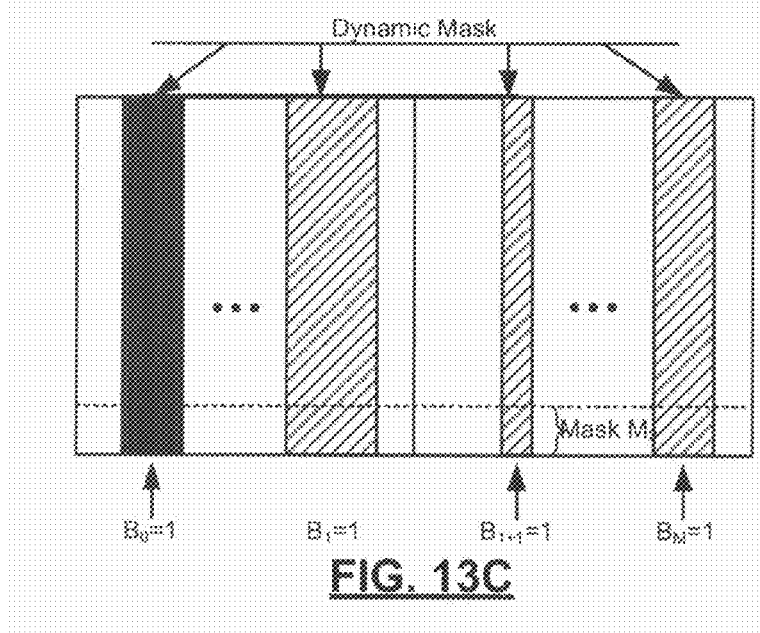

FIGS. 13A-13C represent varying masks which can be utilized in the detection of objects. Generally a mask M indicates the pixels that are to be used in an image for a particular process step. By way of non-limiting example, the mask M may be used in determining which pixels are used to generate a histogram or determining if a portion of an image should be evaluated. The pixels of the image with coordinates (x, y) will be used if M(x, y)=0 . . . 255. These masks can be of fixed size or of a dynamic size. In FIG. 13c, the mask M2 causes the selection of only the first few rows from the bottom of the binary image to generate a histogram that checks for the intensity switch between 0 and 255.

Figure 14:
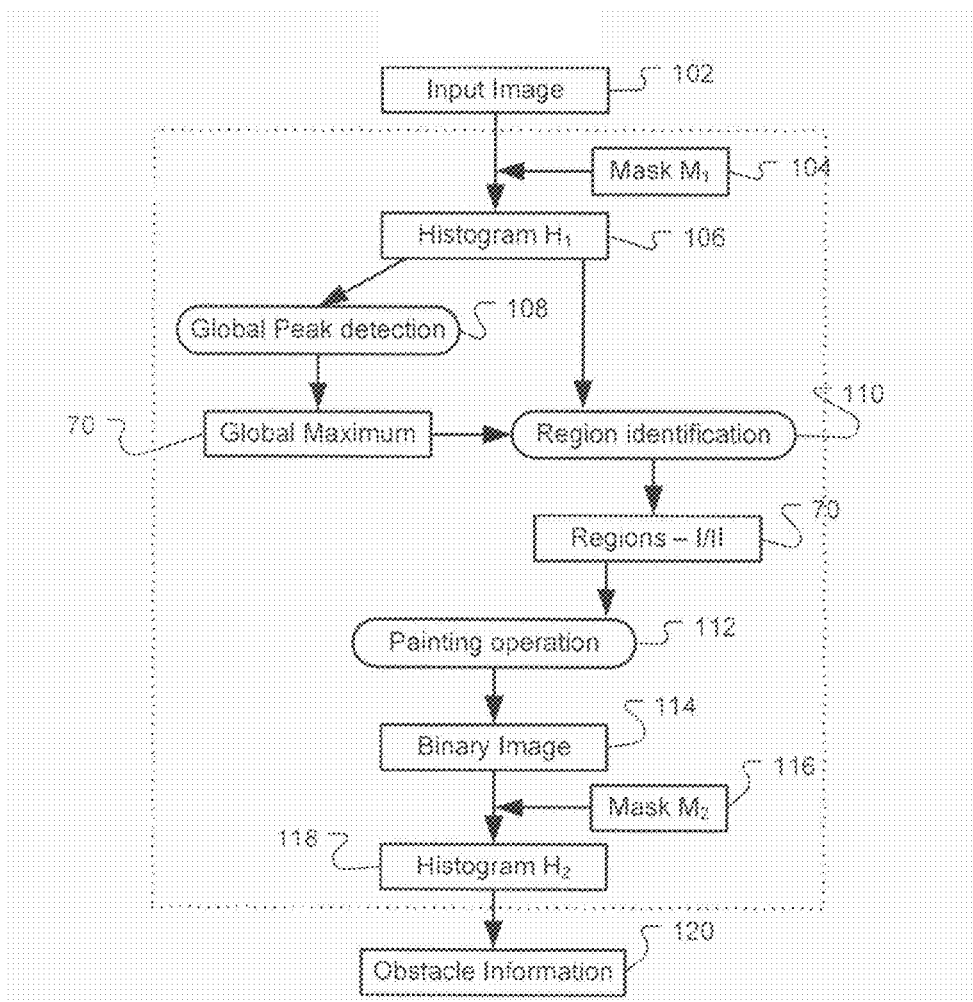
FIG. 14 represents a flow chart of alternate detecting processes according to another teaching.

FIG. 14 is a flow chart depicting an example method for detecting obstacles using machine vision, according to the present teachings. In process block 102, an image is inputted to the processor from the CCD camera. A mask M1 is applied to the input image by the processor, in process block 104. This forms a histogram H1 (process block 106). Optionally, a global peak detection system is run on the histogram H1 to find the global maximum. (See process block 108). In process block 110, regions are identified in the image and are segregated. In this regard, regions can be separated into R1 and R2. In process block 112, all pixels having intensities lying in R1 are now changed to an intensity of 255, i.e. painted white, and those whose intensities are in R2 our changed to intensity zero, i.e. painted black. In process block 114, a binary image BI is used to generate a normalized intensity histogram H2 in process block 60. Note that in this example, the new histogram will have only two intensity levels, that is, zero and 255

When the number of pixels within the $M_2$-masked region of the binary image having a value of zero is more than the number of pixels having a value 255, an obstacle is located close to the mobile platform. Alternatively, when the number of pixels within the $M_2$-masked region of the binary image having an intensity of 255 is greater than the number of pixels having a value 0, an obstacle is deemed absent or located far away from the mobile platform.

Figure 20:
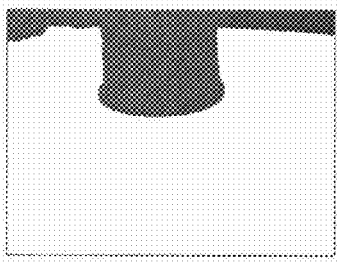
Figure 21:
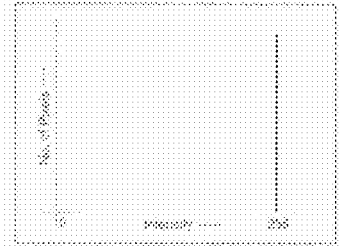

FIGS. 15-23 represent the detection of an object using the system described in FIG. 14. As shown in FIG. 20, the number of pixels occupied by the obstacle are less than that of the pixels occupied by the ground surface. So, the intensity histogram using mask $M_1$ peaks at intensities closer to that of the ground surface. This peak will of us fall into region R1 and all the pixels in this region are painted white and the pixels outside are painted black. Therefore, the ground surface is painted white (i.e., intensity value 255) and the obstacles are painted black (i.e. intensity value zero)

Figure 22:
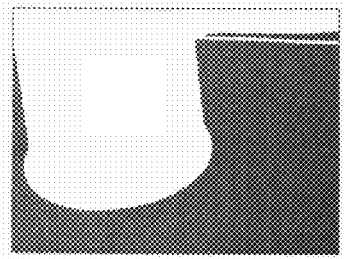
Figure 23:
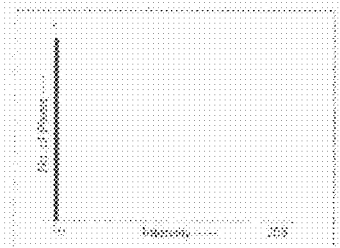

With general reference to the second case, shown in FIG. 22 is the intensity histogram generated using mask $M_2$ and its peak intensity value of 255. This is an indication to the mobile platforms or mobile platform that there are no threatening obstacles and it is safe to move forward. Mask $M_2$ was introduced, which is applied on the binary image $B_1$, and its output is used to generate a normalized intensity histogram $H_2$. Note that the new histogram will have only two intensity levels, that is, 0 and 255. The mask area of $M_2$ is set smaller than that of $M_1$ and it includes those pixels which are closer to the camera.

As the mobile platform moves closer to the obstacle, the obstacle size and the plane image increases. In this situation, the number of pixels, occupied by the obstacle in the masked region $M_1$, increases. The histogram slowly changes its shape, peaking at some other intensity value. Now that it has peaked at intensities closer to that of the obstacle, pixels corresponding to the obstacle are in region R1 and the pixels corresponding to regions of the ground surface R2. So the obstacle is now painted white and the ground surface is painted black the histogram generated by the mask $M_2$ shifts its maximum from 255 intensity value to zero intensity value. This shifting mechanism is called histogramic intensity switching (HIS) which gives an indication to the mobile platform that there is a threatening obstacle in front and it has to avoid them by turning.

The system helps a mobile platform to detect whether there is a threatening obstacle or not. It does not however give information about the location of the obstacle in the field. This information is important as the mobile platform has to navigate between various obstacles present in the field. So, in order to get information about the location of the obstacles, the system is adapted. The image plane may be split into a plurality of regions. Splitting the image plane can be done in different ways. One such way can be achieved by just splitting the mask M into a plurality (three) partitions. The system is executed simultaneously in all three regions and gives information about the presence of threatening obstacles in each of these regions. Thus the mobile platform now has an obstacle map based on which the mobile platform can execute the avoidance maneuver, either by turning to the left or to the right.

Figure 24:
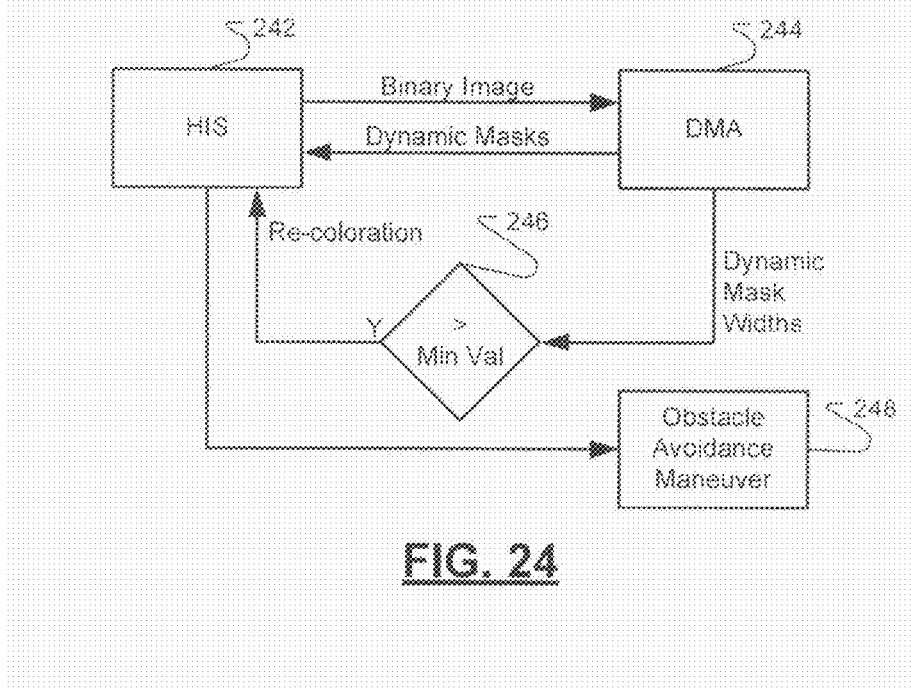
FIG. 24 represents flow chart of alternate detecting processes according to another teaching.
Figure 15:
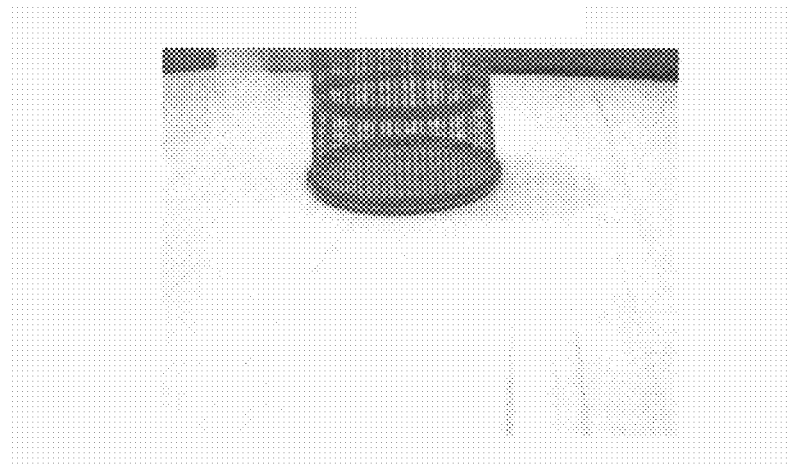
FIGS. 15-23 depict the detection of objects according the process shown in FIG. 14.
Figure 16:
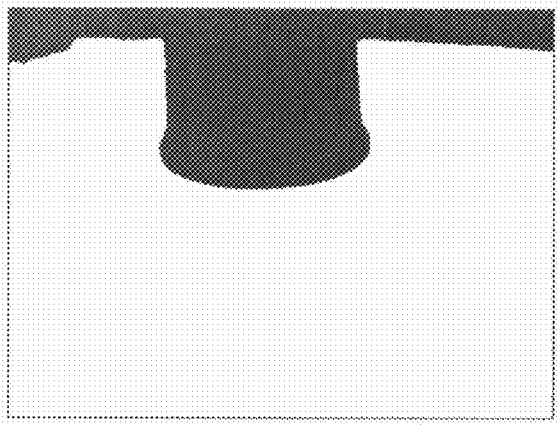
Figure 17:
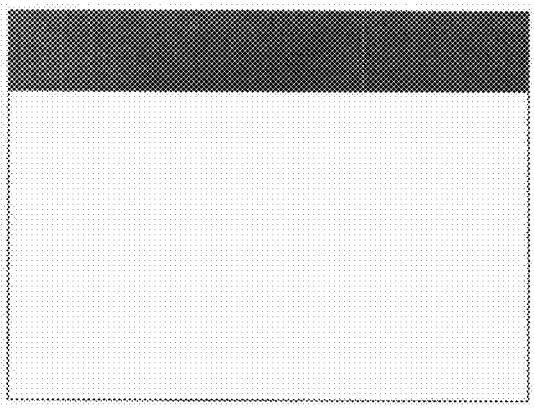
Figure 18:
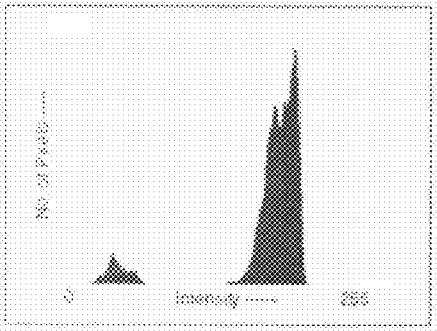
Figure 19:
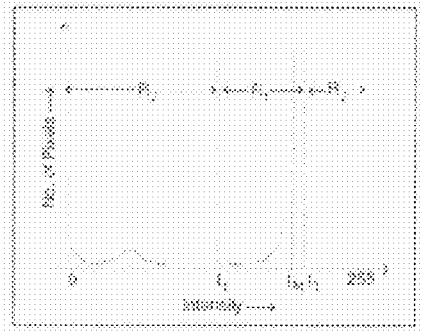

It is envisioned the systems shown in FIGS. 1-3 and 14 can be used to regulate movement of the mobile platform. As shown in FIG. 24, the processor can alternate between the HIS System 242 and the Dynamic Mask (DMA) system 244. In situations where the dynamic mask widths are greater than a minimum value, determined at block 246, the system can revert to the HIS system for a predetermined number of iterations. In order to avoid the positive feedback loop, the system utilizes both the HIS method for one iteration and DMA for the next iteration, alternatively. When the number of pixels occupied by the object is small compared to the number of pixels occupied by the ground surface the system may not register a switch in the intensities of the histogram.

The white pixels that are above the object's black pixels, are the ones corresponding to the ground surface where the mobile platform cannot traverse directly, as the mobile platform approaches the obstacle. Those pixels are deemed equivalent to pixels of an obstacle and are considered part of the obstacle. This makes the obstacle size comparable to that of the mask region and causes a switching. But this, in turn, creates a problem of small obstacles such as a coin or a small stone, being classified as non-traversable obstacles, thereby resulting in replacing the inaccessible pixels with obstacles pixels. This results in undesirable switching. To avoid such a false detection, the mask-width is used as a deciding factor on whether to adopt the above method or not. If the mask-width is below a threshold value, then the method is not opted and therefore not causing the switching to happen even if a dynamic mask gets generated about the object. This threshold can be set based on the mobile platform's capability of climbing over small sized obstacles.

Figures 28A, 28B:
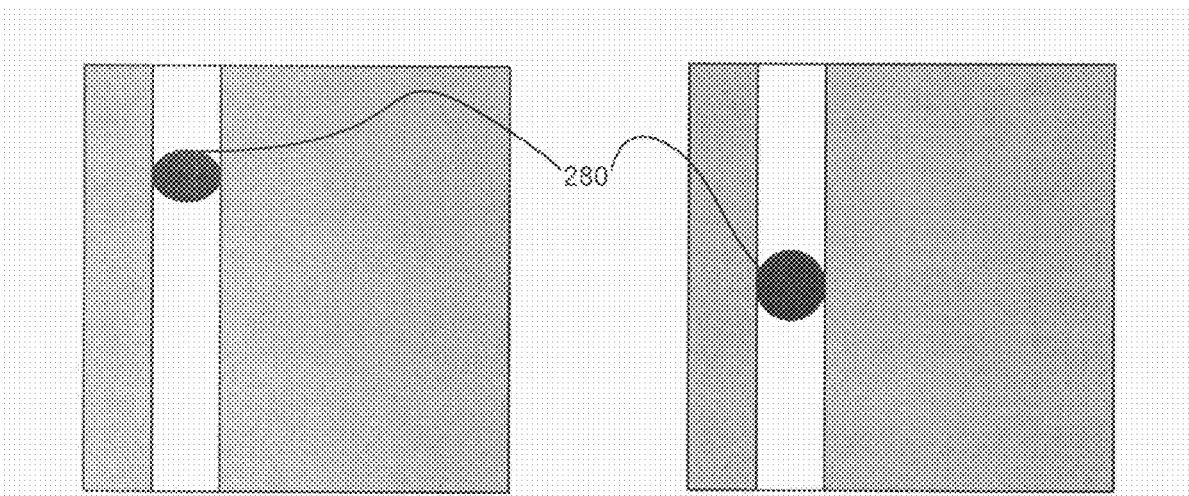
FIGS. 28A and B represent an example of the avoidance system handling the detection of a small object.
Figures 29A, 29B:
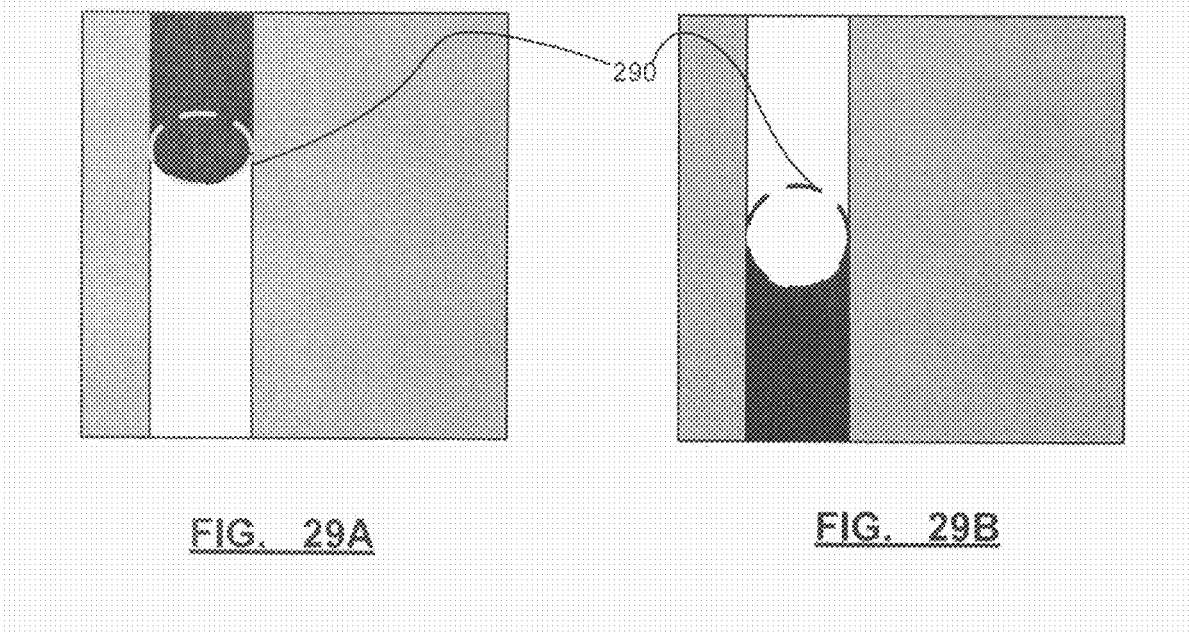
FIGS. 29A and B represent an example of the avoidance system handling the detection of a nontraversable object.

FIGS. 28A and 28B depict the scenario when a small obstacle, such as a coin, is observed in a scene. FIGS. 29A and 29B depict a similar situation with a larger object such as a ball. In FIG. 28A, a small coin 280 is detected and a dynamic mask is generated about the coin. The mask width is less than a predetermined threshold and the system will not perform recoloration of the pixels above or below the obstacle. The contribution due to the obstacle pixels is low in relation to the pixels representing the ground surface in the masked region and thus, no switching occurs. In FIG. 29A, however, a larger obstacle is encountered. In FIG. 29A, the region behind the ball 290 is colored. In this scenario switching does occur due to the amount of colored pixels in relation to the pixels representing the ground surface. FIG. 29B demonstrates the result of the switching. It is noted that the foregoing is provided as an example of dynamic masking of a small image in obstacle to that of a larger obstacle and is in no way intended to be limiting.

Figure 30:
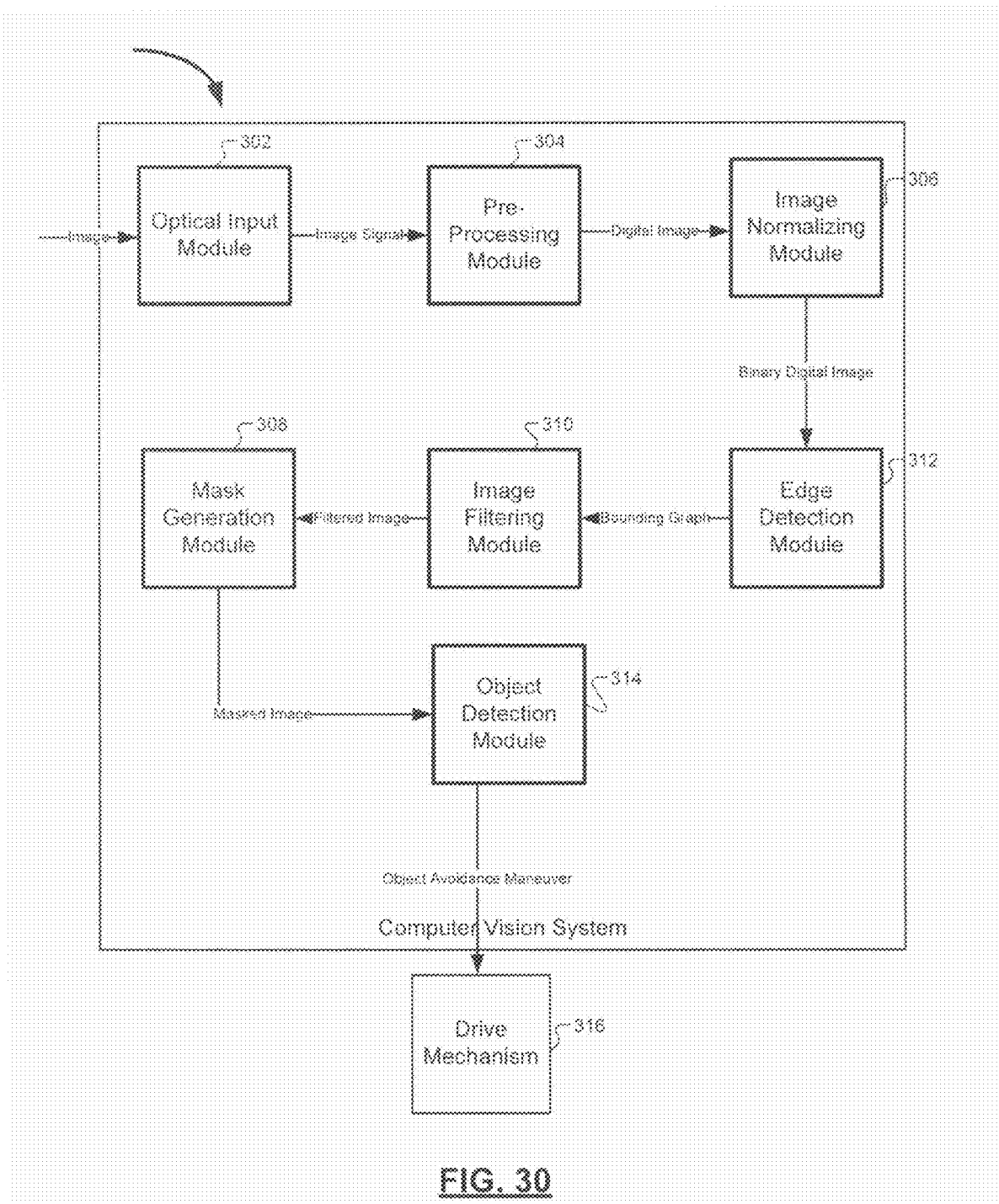
FIG. 30 represents a system level architecture of an example machine vision system.

FIG. 30 represents a system level architecture of an embodiment of the machine vision system 300. As can be seen, the image is captured by an optical input module 302. A signal corresponding to the captured image is sent to a preprocessing module 304. In the preprocessing module 304, the signal is converted into a digital image and may be inverted. The digital image is then normalized by the image normalizing module 306. The image normalizing module will paint all pixels having an intensity value away from the histogram's global maxima to a first intensity level, e.g., 0, and will paint the remaining pixels to a second intensity level, e.g., 255. The result is a binary image The binary image is communicated to the edge detection module 312. In the edge detection module 312, an edge detection algorithm is performed to locate any potential images. As described above, one possible algorithm may be the Canny Edge Detection method. The result is a bounding graph. The bounding graph may have, however, noisy edges. Thus, an image filtering module 310 may smoothen the bounding graph. The filtering module 310 may run the image through a low-pass filter as well as a clipping module, the details of which are described above. The filtered image may then be passed to a mask generation module 308. The mask generation module 308 can analyze the filtered image and may generate a dynamic mask to mask portions of the image. The masked image is then analyzed by a object detection module 314 to determine whether any nontraversable objects exist. In the event such obstacles exist, the object detection module 314 determines the location of the object, as described above, and sends a object avoidance maneuver to the drive mechanism. 316. The foregoing was provided for illustrative purposes only and the functionality of the modules described may correspond to the descriptions provided above.

HIS-DMA results in a binary sequence $B_0, B_1, \ldots, B_m$, where m is the maximum number of masks allowed, referred to as a directionality sequence. The value taken by $B_i$ is based on histogram intensity switching mechanism. It takes the value 1 when switching has occurred and 0 when it has not. The sense of the direction which the mobile platform has to take is determined based on the summation of mask widths whose corresponding $B_i$ registers a value 1. Let al be a value equal to the summation of such switched-mask's width in the left half of the image. And let ar be a value equal to the summation of switched-mask's width in the right half of the image. Let Q be the current state of the mobile platform's motion and Q+ be its next state. The next state Q+ is calculated using Table 1. Q and Q+ takes values (0, 1, 2) for moving right, left and straight, respectively.

Figures 25, 26:
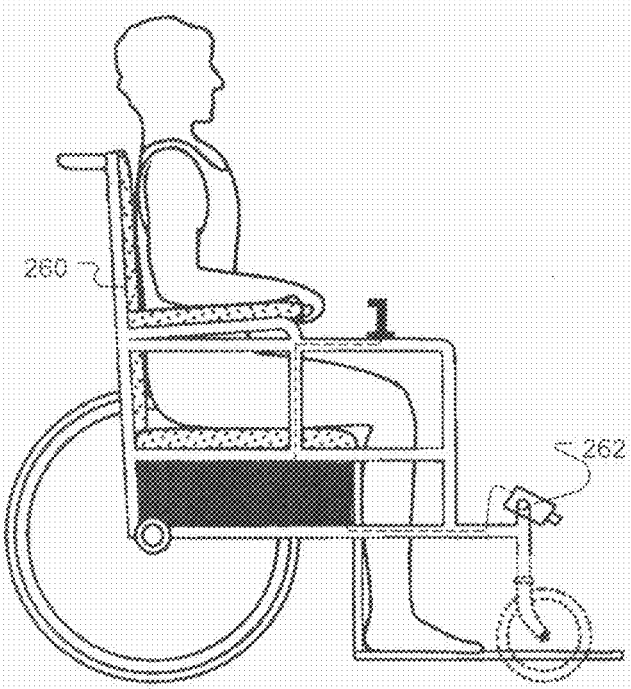
FIG. 25 represents an exemplar truth table according to the present teachings.
FIG. 26 represents a mobile platform according to the present teachings.

As best seen in FIG. 25 a determination of the next state Q+ is made. Obstacle avoidance forms a problem to encounter while traversing a ground surface. The mobile platform has to be quick in recognizing a moving obstacle and also should be capable of recognizing thin vertical objects, such as inclined table legs, to avoid collision. The HIS-DMA system described above successfully avoids all such kinds of obstacles and is also quick to react in real time. Unlike HIS, HISDMA has the capability of maintaining a constant distance inherently based on the camera's orientation while avoiding different sized obstacles.

The mobile platform can include motor driven wheeled vehicles such as robots or wheel chairs. FIG. 26 provides an example embodiment of a mobile platform. This can include a motorized wheelchair 260 equipped with two cameras 262 and a processing unit (not shown). As explained above, HIS-DMA performs obstacle avoidance for a wide variety of obstacles including thin rods, e.g. horizon Q in FIG. 25), and determination of the next state Q+. Obstacle avoidance forms one of the most important problem to encounter while navigating along a path. The system has to be quick in recognizing a moving obstacle and also should be capable of recognizing thin vertical obstacles such as inclined table legs to avoid collision. HISDMA successfully avoids all such kinds of obstacles and is also quick to react in real time. The system also has an advantage over other range sensors in avoiding ditches and recognizing the pavements and the roads.

There may be two cameras 262 attached to the mobile platform 260. In such a configuration, one camera may be placed over each wheel in order to give a wider view of the scene around. Each camera works individually and the obstacle data from both the cameras are analyzed to make a turn to avoid the obstacle. Although it is envisioned that the images captured by both cameras may be combined to assess the situation from a common view of the scene, the two camera system makes it possible to analyze each camera's input individually. Each camera may observe different obstacles. If an obstacle is observed by either camera, appropriate steps may be taken to avoid the obstacle. This method can reduce the complexity of the computations that need to be performed in combining the images. The motorized wheelchair is free to move when there are no detected obstacles in front. But when the system registers a switch on encountering an obstacle it makes an appropriate turn based on the obstacle's position with respect to the wheelchair.

It is envisioned that the mask partitions can be dynamically generated depending on the desired speed. For example, the reference image can be divided in half to determine if the location of the obstacle is available. Likewise, the image can be recursively divided until the location of the obstacle is ascertained. Based on these divisions of the histogram, the mobile platform can determine the most likely clear path.

Should the mobile platform be a robotic cleaning system, the base structure the base can have a vacuum system or a liquid holding and dispersing mechanism. Additionally, the base can have a driven wheel drive propelled by an electric Motor. The processor of a cleaning system is configured to allow an operator to input an off-line path planning with respect a floor plan and configured to allow the initialization of the mobile platform location prior to the start of an operation. Additionally, the processor can be configured to perform one of a cycle of continuous path execution, perception and localization, event driven path adaptation. Should the processor utilize an events driven path adaptation the system may perform compensation of path tracking errors, and path replanning in case of blockades. It is envisioned the processor can be configured to allow the extraction of uncleaned areas from a drive path after completion of nominal cleaning processes. It is envisioned the processor is configured to calculate appropriate paths to cover all accessible unclean areas and to inspect a digital image and determine the presence of dirt in an area.

Figure 31:
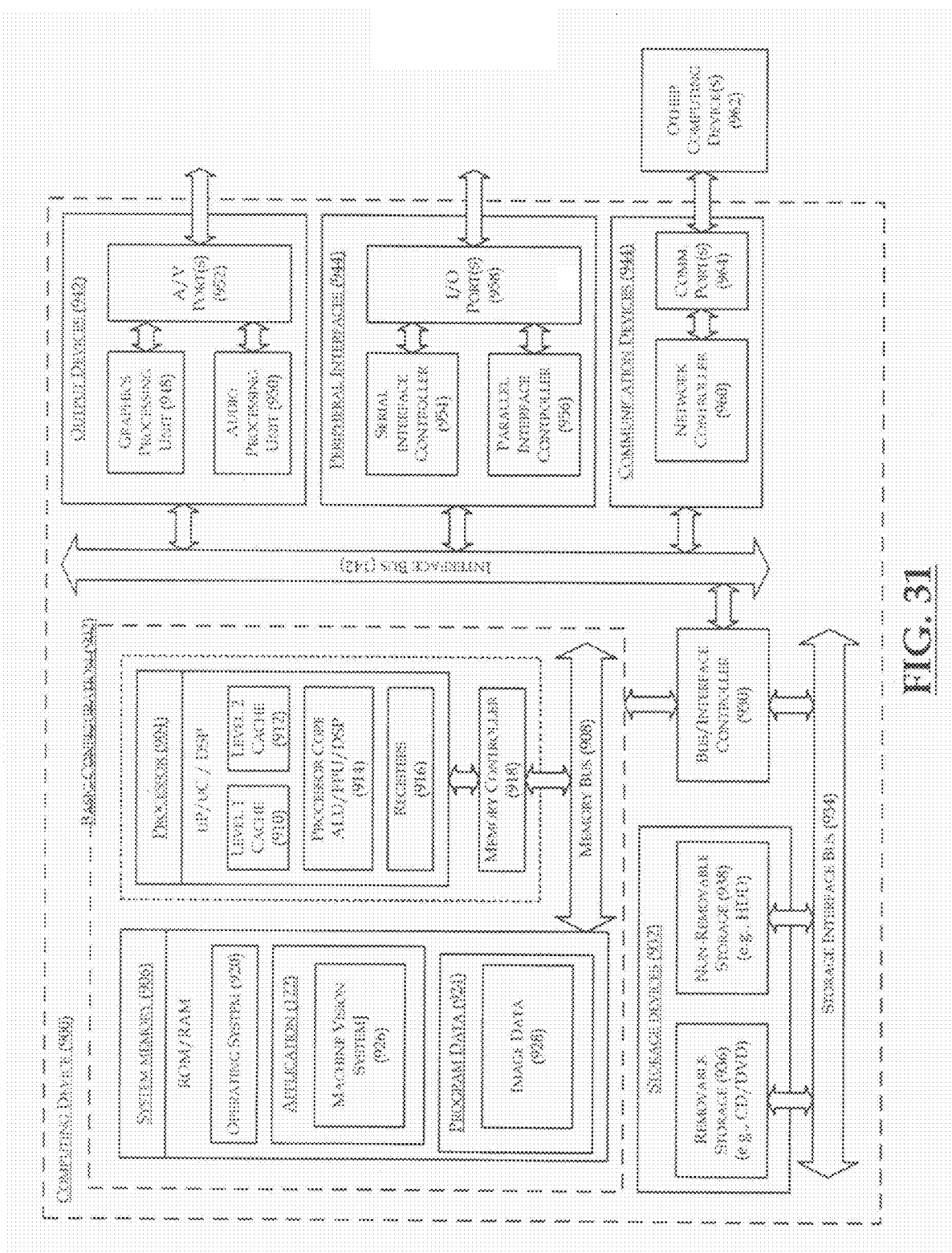
FIG. 31 is a block diagram illustrating an example computing device that is arranged for a machine vision system.

FIG. 31 is a block diagram illustrating an example computing device 900 that is arranged for a machine vision system in accordance with the present disclosure. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (I-PU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a machine vision system 926 that is arranged to perform one or more of the methods described in FIGS. 1, 2 and 14 of the present disclosure and may have an architecture of the machine vision system disclosed in FIG. 30. Program Data 924 may include image data 928 that may be useful for the implementation of the machine vision methods and system, described above. In some embodiments, application 922 may be arranged to operate with program data 924 on operating system 920 such that obstacle avoidance via machine vision may be realized. This described basic configuration 902 is illustrated in FIG. 30 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (NIDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The foregoing summary is illustrative only and is not intended to be in any way limiting. In addition to the illustrative aspects, embodiments, and features described above, further aspects, embodiments, and features will become apparent by reference to the drawings and the following detailed description. A wheelchair is a wheeled mobility device in which the user sits. The device is propelled either manually (by turning the wheels by the hand) or via various automated systems. Wheelchairs are used by people for whom walking is difficult or impossible due to illness (mental or physical), injury, or disability. A basic standard manual wheelchair incorporates a seat and back, two small front (caster) wheels and two large wheels, one on each side, and a foot rest. Wheelchairs are often variations on this basic design, but there are many types of wheelchairs, and they are often highly customized for the individual user's needs. Motorized wheel chairs are electric powered with a joystick to control the movement of the wheelchair. Incorporating obstacle avoidance system to the wheelchair brings about a great advantage as to increase the safety of the person using it. Computer vision plays a vital role in this application as it forms the closest substitute to our vision system. It helps in avoiding the obstacles like humans passing by and recognizing the path boundaries which may not be effectively detected using any of the range sensors like infrared or ultrasonic. As such, the system is equally applicable, by way of non-limiting examples, to other mobile platforms such a self propelled wheel chairs, a robotic cleaners, a robotic vacuum cleaners, or even hand held apparatus such as a cane.

Specially, recognizing ditches, differentiating between the pavements and the road, etc.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components. Additionally, the methods and systems herein discuss "pixels." It is envisioned herein that this limitation includes hardware or software memory locations.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, the various aspects and embodiments are for purposes of illustration and are not intended to be limiting, with the true scope and spirit being indicated by the following claims.

The invention claimed is:

1. A mobile platform comprising: a base structure; a drive mechanism coupled to the base structure; a machine vision system including: an optical input module configured to capture an image in the form of a signal; a pre-processing module configured to: receive the signal from the optical input module, convert the signal into a first digital image, set a first threshold comprising:

$$I_L = \max\{i | f(i-\delta) > f(i), f(i+\delta) > f(i)\}$$

set a second threshold comprising:

$$I_R = \min\{j | f(j-\delta) > f(j), f(j+\delta) > f(j)\}$$

wherein i and j are each an intensity, f(i) is a number of pixels having the intensity i found from an intensity histogram, and δ is a resolution parameter; invert the first digital image; an image normalizing module configured to normalize the inverted digital image by: setting a first plurality of pixels in the inverted digital image having an intensity less than the first threshold or greater than the second threshold to a first predetermined intensity, and setting a second plurality of pixels in the inverted digital image having an intensity greater than or equal to the first threshold or less than or equal to the second threshold to a second predetermined intensity; an edge detection module configured to: receive the normalized digital image, and perform edge detection on the normalized digital image, thereby outputting a bounding graph indicating edges of detected objects in the image; and a detection module configured to: receive the bounding graph, determine local maximums and zeros in the bounding graph, and determine a dynamic mask based on the local maximums and zeros, wherein the dynamic mask is applied to a second digital image to determine the presence of an object.

2. The mobile platform of claim 1, further comprising an image filtering module configured to: receive the bounding graph from the edge detection module, and filter noise peaks in the bounding graph.

3. The mobile platform of claim 2, further comprising a clipping module configured to: receive the bounding graph from the image filtering module, remove a portion of the bounding graph corresponding to additional noise in the bounding graph, and replace the removed portion with a smoothed portion.

4. The mobile platform of claim 1, wherein the dynamic mask indicates an object detected in a field of view of the optical input module, and wherein a width and a height of the dynamic mask indicate a traversability of an area corresponding to the dynamic mask.

5. The mobile platform of claim 1, further comprising an object detection module configured to: partition the first digital image into a plurality of sections, and determine a location of the object by determining a section of the plurality of sections having the dynamic mask located therein.

6. The mobile platform of claim 5, wherein the object detection module is configured to send an object avoidance signal to the drive mechanism thereby causing the base structure to avoid the detected object, wherein the object avoidance signal is based on the determined location of the object.

7. The mobile platform of claim 1, further comprising a histogram generation module configured to: receive an input image, and generate the intensity histogram indicating frequencies of pixel intensities of the plurality of pixels ranging from 0 to 255, wherein the intensity histogram is used to generate a binary image by assigning pixels with predetermined intensities, and the binary image is used to determine an existence of an object.

8. The mobile platform of claim 1, wherein a second dynamic mask is applied to the second digital image to determine a presence of objects that are in close proximity to the optical input module, wherein the second dynamic mask corresponds to a bottom portion of the image.

9. The mobile platform of claim 1, wherein the pre-processing module is configured to convert the first digital image into grayscale.

10. The mobile platform of claim 1 wherein the base structure comprises one of a motorized wheel chair, a wheel chair, a robotic cleaner, a robotic vacuum, and a cane.

11. A method of determining a presence of an object, comprising: inverting a digital image comprising a plurality of pixels;
setting a first threshold comprising:

$$I_L = \max\{i | f(i-\delta) > f(i), f(i+\delta) > f(i)\}$$

setting a second threshold comprising:

$$I_R = \min\{j | f(j-\delta) > f(j), f(j+\delta) > f(j)\}$$

wherein i and j are each an intensity, f(i) is a number of pixels having the intensity i found from an intensity histogram, and δ is a resolution parameter; normalizing the inverted digital image by: setting first pixels in the plurality of pixels having an intensity value less than the first threshold or greater than the second threshold to a first predetermined intensity, and setting second pixels in the plurality of pixels having an intensity value between the first threshold and the second threshold to a second predetermined intensity;

performing edge detection on the normalized digital image, thereby outputting a bounding graph indicating an edge of a detected object in the digital image;

determining local maximums and zeros in the bounding graph; determining a dynamic mask based on the local maximums and zeros; and applying the dynamic mask to the normalized digital image to determine a presence of an object.

12. The method of claim 11, further comprising filtering noise peaks in the bounding graph.

13. The method of claim 12, further comprising removing a portion of the bounding graph corresponding to additional noise in the bounding graph and replacing the removed portion with a smoothed portion.

14. The method of claim 11, wherein the dynamic mask indicates the object detected in a field of view, and wherein a width and a height of the dynamic mask indicate a traversability of an area corresponding to the dynamic mask.

15. The method of claim 11, further comprising applying a first fixed mask to the normalized digital image and partitioning the fixed mask digital image into a plurality of sections to determine a location of the object.

16. The method of claim 15, further comprising sending an object avoidance signal to a drive mechanism thereby causing a base structure to avoid the detected object, wherein the object avoidance signal is based on the determined location of the object.

17. The method of claim 11, further comprising determining an intensity value corresponding to a maximum peak of an intensity histogram for a digital image, wherein the intensity histogram is used to generate a binary image by assigning pixels with the first and second predetermined intensity.

18. The method of claim 17, further comprising applying a first fixed mask to the input image to generate the intensity histogram; and applying a second fixed mask to the binary image to determine a presence of objects that are in close proximity to a base platform by looking for an intensity switch.

19. The method of claim 11, further comprising converting the digital image into grayscale.

20. A mobile platform comprising:
a base structure comprising one of a motorized wheel chair, a wheel chair, a robotic cleaner, a robotic vacuum, and a cane;
a drive mechanism coupled to the base structure;
a machine vision system including: an optical input module that captures an image in the form of a signal;
a pre-processing module configured to: receive the signal from the optical input module, convert the signal into a grayscale digital image, invert the digital image,
set a first threshold comprising:

$I_L = \max\{i | f(i-\delta) > f(i), f(i+\delta) > f(i)\}$ set a second threshold comprising:

$I_R = \min\{j | f(j-\delta) > f(j), f(j+\delta) > f(j)\}$ wherein i and j are each an intensity, f(i) is a number of pixels having the intensity i found from an intensity histogram, and $\delta$ is a resolution parameter;

an image normalizing module configured to normalize the inverted digital image by: setting a first plurality of pixels having an intensity less than the first threshold or greater than the second threshold to a first predetermined intensity, and setting a second plurality of pixels having an intensity greater than or equal to the first threshold or less than or equal to the second threshold to a second predetermined intensity;

an edge detection module configured to: receive the normalized digital image, and perform edge detection the normalized digital image, thereby outputting a bounding graph indicating edges of detected objects in the image;

an image filtering module configured to: receive the bounding graph from the edge detection module, and filter noise peaks in the bounding graph;

a clipping module configured to: receive the filtered bounding graph from the image filtering module, remove a portion of the filtered bounding graph corresponding to additional noise in the filtered bounding graph, and replace the removed portion with a smoothed portion;

a detection module configured to: receive the clipped and filtered bounding graph, determine local maximums and zeros in the graph, and determine a dynamic mask based on the local maximums and zeros, wherein the dynamic mask is applied to a second digital image to determine the presence of an object;

and an object detection module configured to: partition the second digital image into a plurality of sections, and determine a location of the object by determining a section of the plurality of sections having the dynamic mask located therein.

\* \* \* \* \*

UNITED STATES PATENT AND TRADEMARK OFFICE
CERTIFICATE OF CORRECTION

Page 1 of 2

PATENT NO.         : 8,675,060 B2
APPLICATION NO.    : 12/643207
DATED              : March 18, 2014
INVENTOR(S)        : Ghose et al.

It is certified that error appears in the above-identified patent and that said Letters Patent is hereby corrected as shown below:

On the title page, item (73), under "Assignee", in Column 1, Line 1, delete "Kamataka" and insert -- Karnataka --, therefor.

In the Drawings

In Fig. 31, Sheet 13 of 13, delete "COMMUNICATION DEVICES (944)" and insert -- COMMUNICATION DEVICES (946) --, therefor.

In the Specification

In Column 1, Line 41, delete "of is" and insert -- of $I_1$ is --, therefor.

In Column 2, Line 13, delete "represents flow" and insert -- represents a flow --, therefor.

In Column 2, Line 59, delete "block 58" and insert -- block 58. --, therefor.

In Column 3, Line 62, delete "$I_t$." and insert -- $I_1$. --, therefor.

In Column 4, Line 30, delete "$H_{if}$" and insert -- $H_{1f}$ --, therefor.

In Column 5, Line 52, delete "M2" and insert -- $M_2$ --, therefor.

In Column 5, Line 52, delete "M2" and insert -- $M_2$ --, therefor.

In Column 5, Line 59, delete "M1" and insert -- $M_1$ --, therefor.

In Column 5, Line 61, delete "H1" and insert -- $H_1$ --, therefor.

In Column 5, Line 62, delete "H1" and insert -- $H_1$ --, therefor.

Signed and Sealed this
Second Day of September, 2014

Michelle K. Lee
*Deputy Director of the United States Patent and Trademark Office*

CERTIFICATE OF CORRECTION (continued)
U.S. Pat. No. 8,675,060 B2

In Column 6, Line 5, delete "and 255" and insert -- and 255. --, therefor.

In Column 6, Line 23, delete "zero)" and insert -- zero). --, therefor.

In Column 7, Line 59, delete "image" and insert -- image. --, therefor.

In Column 8, Line 37, delete "HISDMA" and insert -- HIS-DMA --, therefor.

In Column 8, Line 52, delete "HISDMA" and insert -- HIS-DMA --, therefor.

In Column 9, Line 48, delete "(I-PU)," and insert -- (FPU), --, therefor.

In Column 10, Line 17, delete "(NIDD)," and insert -- (HDD), --, therefor.

In Column 12, Line 10, delete "and or" and insert -- and/or --, therefor.